United States Patent [19]

Monford, Jr.

[11] Patent Number: 5,145,227
[45] Date of Patent: Sep. 8, 1992

[54] ELECTROMAGNETIC ATTACHMENT MECHANISM

[75] Inventor: Leo G. Monford, Jr., Dickinson, Tex.

[73] Assignee: The United States of America as represented by the Administrator of the National Aeronautics and Space Administration, Washington, D.C.

[21] Appl. No.: 636,531

[22] Filed: Dec. 31, 1990

[51] Int. Cl.$^5$ .................. B25J 15/06; B64G 1/64; B66C 1/04
[52] U.S. Cl. .................. 294/65.5; 244/161; 294/66.2; 294/86.4; 294/907; 414/737; 901/40
[58] Field of Search .................. 294/65.5, 66.2, 86.4, 294/907; 244/158 R, 161; 335/285–287, 289–291; 361/143–145; 414/730, 737; 901/40, 46, 47, 49

[56] References Cited

U.S. PATENT DOCUMENTS

| | | | |
|---|---|---|---|
| 3,582,017 | 6/1971 | Zecca | 244/161 |
| 4,030,441 | 6/1977 | Nagata et al. | 294/65.5 X |
| 4,260,187 | 4/1981 | Frosch et al. | 294/86.4 |
| 4,295,740 | 10/1981 | Sturges, Jr. | 244/161 X |
| 4,350,379 | 9/1982 | Peroutky | 294/65.5 |
| 4,439,674 | 3/1984 | Amberny et al. | |
| 4,631,815 | 12/1986 | Bocchicchio et al. | 901/40 X |
| 4,890,918 | 1/1990 | Monford | 244/161 X |
| 4,921,292 | 5/1990 | Harwell et al. | 294/65.5 |
| 4,965,695 | 10/1990 | Baumann | 294/65.5 X |

Primary Examiner—Johnny D. Cherry
Attorney, Agent, or Firm—Hardie R. Barr; Guy M. Miller; Edward K. Fein

[57] ABSTRACT

An electromagnetic attachment mechanism for use as an end effector of a remote manipulator system. A pair of electromagnets 15A, 15B, each with a U-shaped magnetic core with a pull-in coil 34 and two holding coils 35,36 are mounted by a spring suspension system 38,47 on a base plate 25 of the mechanism housing 30 with end pole pieces 21,22 adapted to move through openings in the base plate when the attractive force of the electromagnets is exerted on a strike plate 65 of a grapple fixture 20 affixed to a target object 14. The pole pieces are spaced by an air gap from the strike plate when the mechanism first contacts the grapple fixture. An individual control circuit and power source is provided for the pull-in coil and one holding coil of each electromagnet. A back-up control circuit connected to the two power sources and a third power source is provided for the remaining holding coils. When energized, the pull-in coils overcome the suspension system and air gap and are automatically de-energized when the pole pieces move to grapple and impose a preload force across the grapple interface. A battery back-up 89A, 89B is a redundant power source for each electromagnet in each individual control circuit and is automatically connected upon failure of the primary power source. A centerline mounted camera 31 and video monitor 70 are used in cooperation with a target pattern 19 on the reflective surface 67 of the strike plate to effect targeting and alignment.

22 Claims, 11 Drawing Sheets

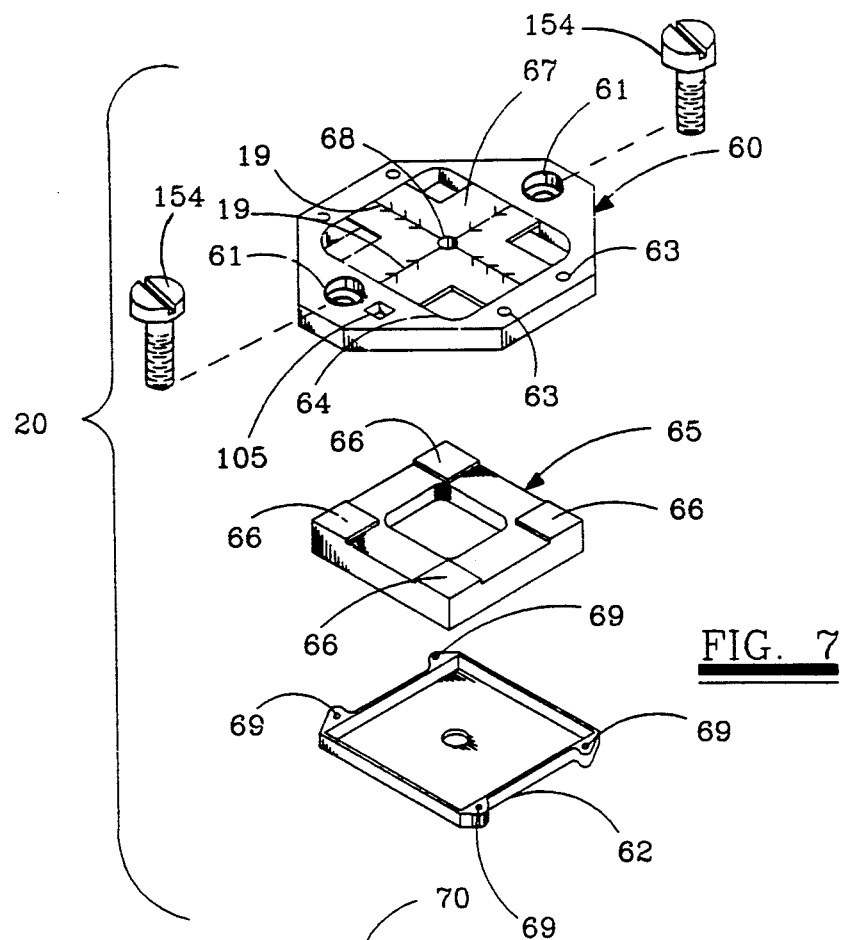
FIG. 7
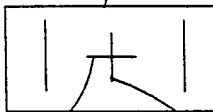
FIG. 8A
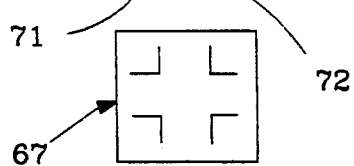
FIG. 8B
FIG. 8C
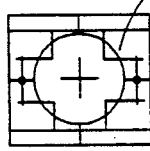
FIG. 8D
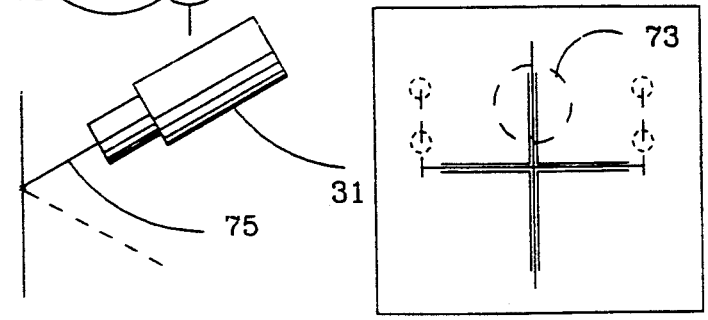
FIG. 9A
FIG. 9B

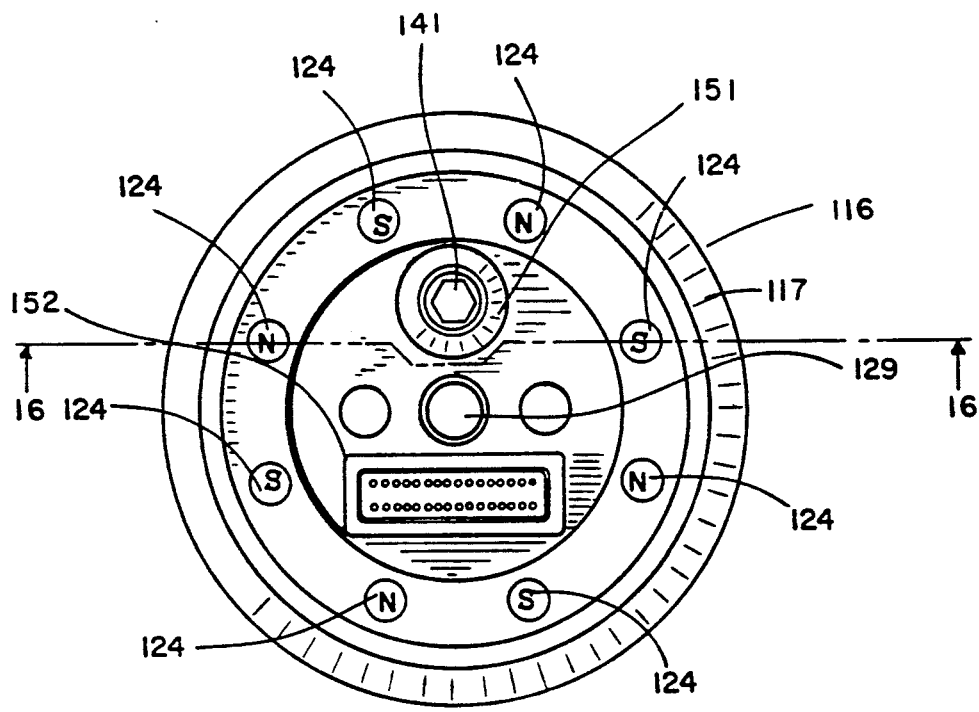
FIG. 15
FIG. 16
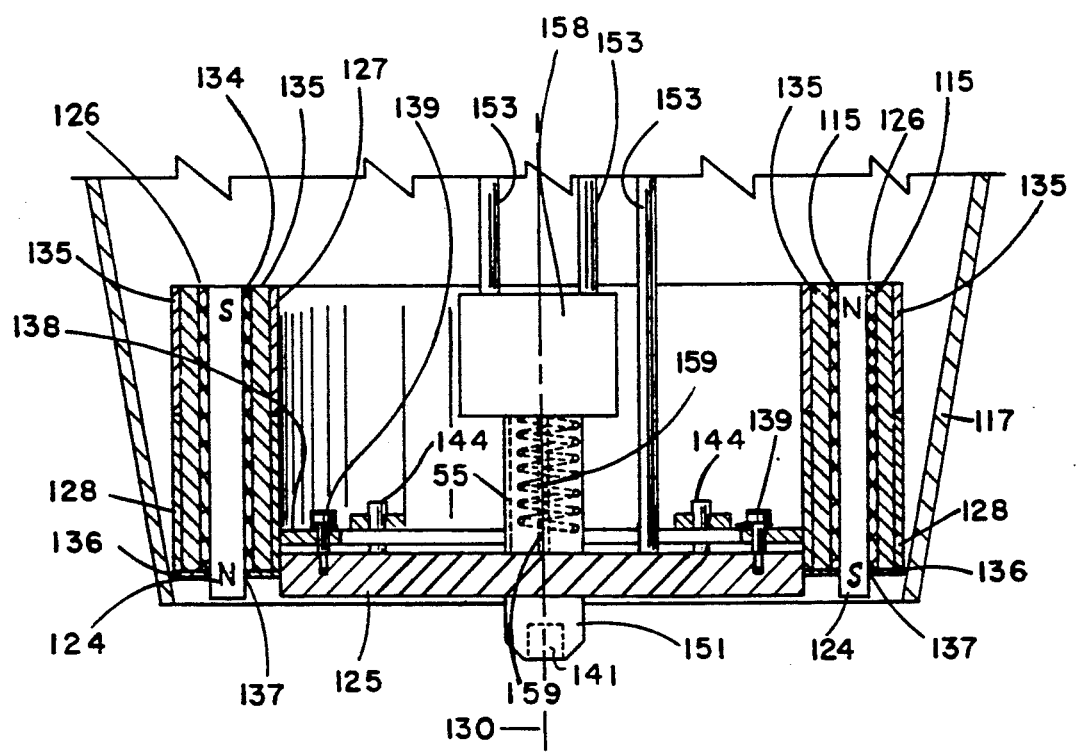

ELECTROMAGNETIC ATTACHMENT MECHANISM

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to article handling devices and more particularly to an electromagnetic attachment and holding device which utilizes magnetic force for attaching an object or payload.

BACKGROUND ART

A variety of robotic systems and end effectors have heretofore been devised for the grappling, handling and manipulation of diverse objects. For operations in the environment of outer space, the Shuttle Orbiter spacecraft has been equipped with a remote manipulating system for such purposes as maneuvering a payload from a spacecraft bay to a deployment position or for grappling a free-flying space satellite or other object. The system is subject to control by a human operator relying on visual observation or television viewing of the target object. For almost all such applications, the grappling device or end effector associated with the manipulator arm is desirably of small size, light weight, and readily adaptable to handling payloads of various sizes, masses, and shapes.

Previously, in space operations payloads have been attached to the arm of the remote manipulator system by a cable snare and tensioning grappling mechanism, often referred to as a Standard End Effector. The Standard End Effector requires a grapple fixture to be attached to the object to be grappled. Such a grapple fixture consists of a mounted post with three alignment cams arranged in equiangular spacing of 120 degrees surrounding the post. The disadvantages of the Standard End Effector include mechanical complexity and low reliability. Disadvantages associated with the grapple fixture used in conjunction therewith are its large physical envelope, precise tolerance requirements, and high manufacturing cost. Other end effectors have also been devised, such as disclosed in U.S. Pat. No. 4,921,292 which incorporate permanent magnets for using the attraction of magnetism to ferrous materials for attaching an object or payload. A significant disadvantage of a magnetic end effector with a permanent magnet is that if the mechanical linkage which actuates the magnet fails to function, then the attached object cannot be released. Additionally, since such an end effector requires a rigidized sensing grapple fixture for operation, should the end effector lose electrical power, the payload cannot be released by the remote manipulator system.

SUMMARY OF THE INVENTION

The invention is a two-fault tolerant electromagnet attachment mechanism which is adapted for interfacing with the manipulator arm of a remote manipulator system and effecting the grapple of a target object by the attractive force of the magnetic field of one or more electromagnets. The mechanism is provided with a housing having a base plate at one end thereof and at least one electromagnet mounted in the housing. The electromagnet of the preferred embodiment comprises a U-shaped magnetic core with pole pieces at the ends thereof and a plurality of coils comprising a pull-in coil and a pair of holding coils wound about the magnetic core between said pole pieces. The base plate is provided with openings therethrough which are sized to accommodate the pole pieces. Each electromagnet is mounted in the housing on a spring suspension system with the pole pieces exposed by the openings in the base plate and adapted for movement through said openings when attracted to a ferrous strike plate affixed to a target object.

Means are provided on the housing for maintaining the pole pieces in spaced relation to the strike plate when said base plate of the housing is directed into engagement with the grapple fixture to thereby establish a gap therebetween.

The attachment mechanism of the invention includes means for energizing the electromagnet coils whereby each electromagnet pull-in coil exerts an attractive force on the grapple strike plate when in proximity thereto to cause the pole pieces to move through the base plate openings to contact and grapple the strike plate and thereby impose a preload force of predetermined magnitude across the grapple interface. A preload sensor is provided for detecting the movement of the pole pieces in establishing the preload force and for generating an electrical output signal indicative thereof. Means are also provided for de-energizing each pull-in coil in response to the preload sensor signal whereby grapple of the target object is maintained solely by the attractive force of the holding coils. A battery back-up is provided as a redundant power source for each electromagnet. Alignment capability is provided by a centerline video camera which views through a central opening in the base plate and a monitor which displays the reflection of the camera lens and a visible pattern provided on a reflective surface of the grapple fixture which when aligned by an operator of the remote manipulator system places the attachment mechanism in proper alignment with the grapple fixture in preparation for effecting a grapple.

BRIEF DESCRIPTION OF THE DRAWINGS

FIG. 7 is an exploded isometric view of a magnetic grapple fixture which is adapted to be mounted on a target object to facilitate its capture and attachment by the end effector of the invention;

FIG. 8A is a television monitor display used in a target alignment and docking system which is a part of the invention;

FIG. 8B is a front view of a two-dimensional mirror which may be provided on the target grapple plate;

FIG. 8C is a camera lens view and an illustration of the arrangement of cross hair indicator lines therein, for a television camera which is a component of a target alignment and docking system incorporated in the invention;

FIG. 8D is representative of an image displayed in real-time on a monitor display screen when the end effector of the invention is properly aligned with the target to effect its capture and attachment;

FIG. 9A is a simplified pictorial representation of a mirror surface which is centered but is not perpendicular to the optical axis of the camera in the target alignment and docking system of FIG. 8;

FIG. 9B is a monitor display showing pitch or yaw error indicated by offset of the reflected image produced as a result of the conditions shown in FIG. 9A;

FIG. 15 is an end view of the electromagnetic end effector of FIG. 14; and

FIG. 16 is a fragmentary cross section view as taken along the section line 16—16 in FIG. 15 showing details of construction and mounting of electromagnets in the embodiment of the invention shown in FIG. 14.

DETAILED DESCRIPTION OF THE INVENTION

Figure 1:
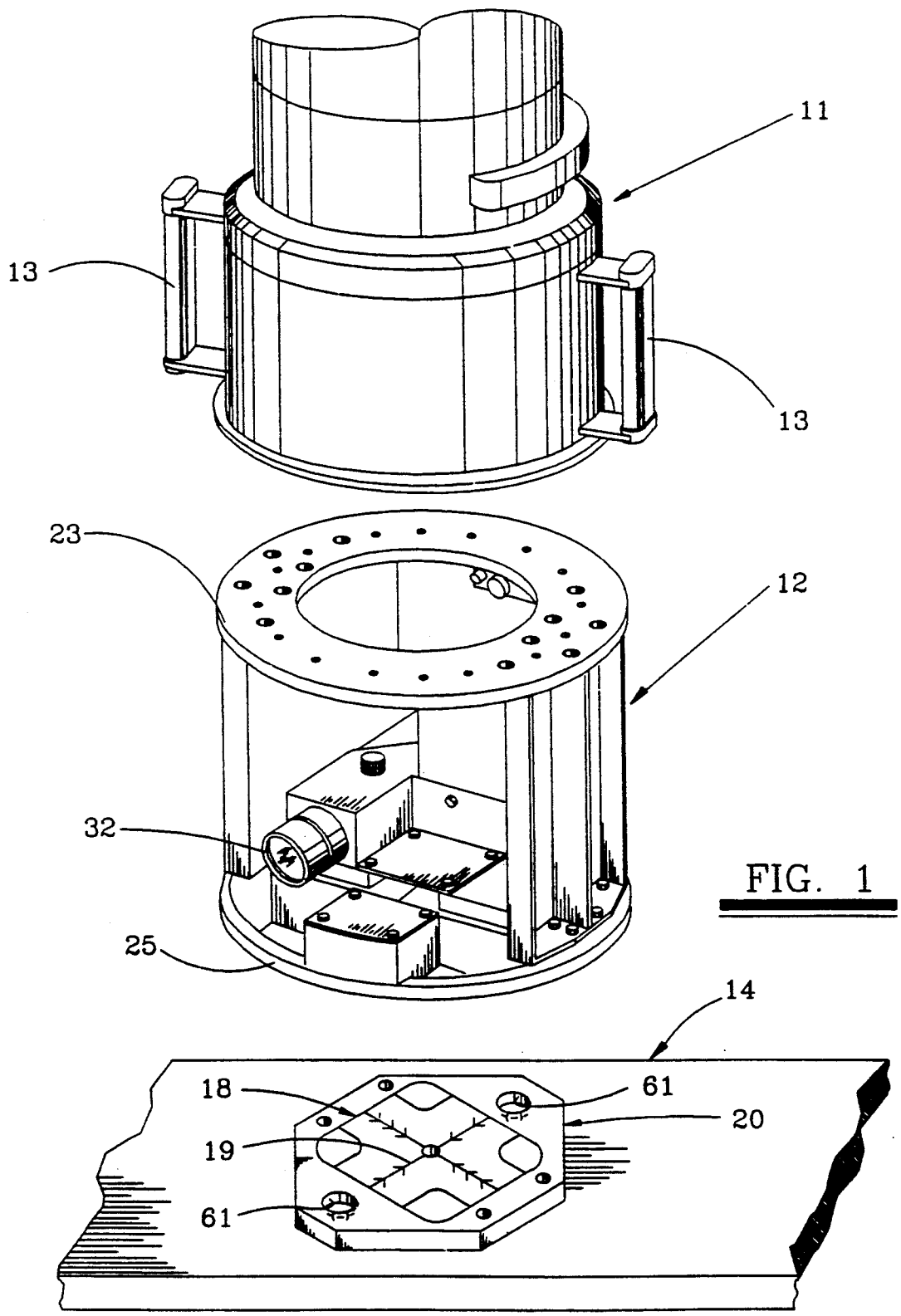
FIG. 1 is an exploded view in perspective showing the end portion of the manipulator arm of a remote manipulator system, the electromagnetic end effector of the invention which is operably connected to the end of the manipulator arm and is shown with portions of the side wall removed to show details, and a portion of a payload target structure adapted by a ferrous plate fixed thereon to be magnetically attracted to the electromagnetic end effector.

Referring more particularly to the drawings, there is shown in FIG. 1 in exploded view, an end portion of the manipulator arm 11 of a remote manipulator system and an electromagnetic attachment mechanism 12 representing a preferred embodiment of the invention which is adapted to be connected to the end of the manipulator arm in operative association therewith. When mounted on the manipulator arm, the electromagnetic attachment mechanism 12 may be guided and controlled to effect an attachment to an object to be captured.

In the application of the invention, as illustrated in FIG. 1, the object 14 represents a payload in the environment of outer space which has been provided with a visual alignment aid 18, such as a mirrored surface with a target pattern 19 thereon which when viewed by video cameras mounted in the housing of the electromagnetic attachment mechanism 12 allows an operator of the remote manipulator system to guide the electromagnetic attachment mechanism into contact with a ferrous plate of a grapple fixture 20 which is mounted on the object 14 to facilitate a capture and permit a rigidized attachment to the object and its effective capture.

Figure 2:
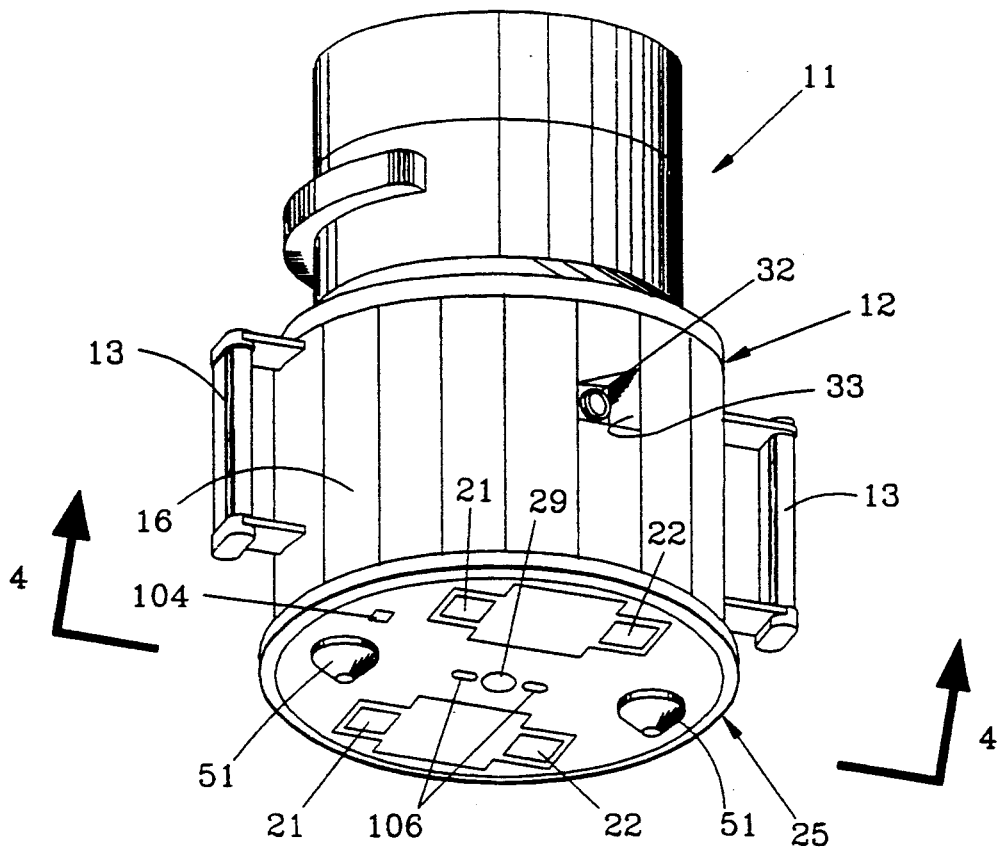
FIG. 2 is a view in perspective of the electromagnetic end effector of the invention, showing the location and orientation of magnetic pole plates on the end effector.
Figure 3:
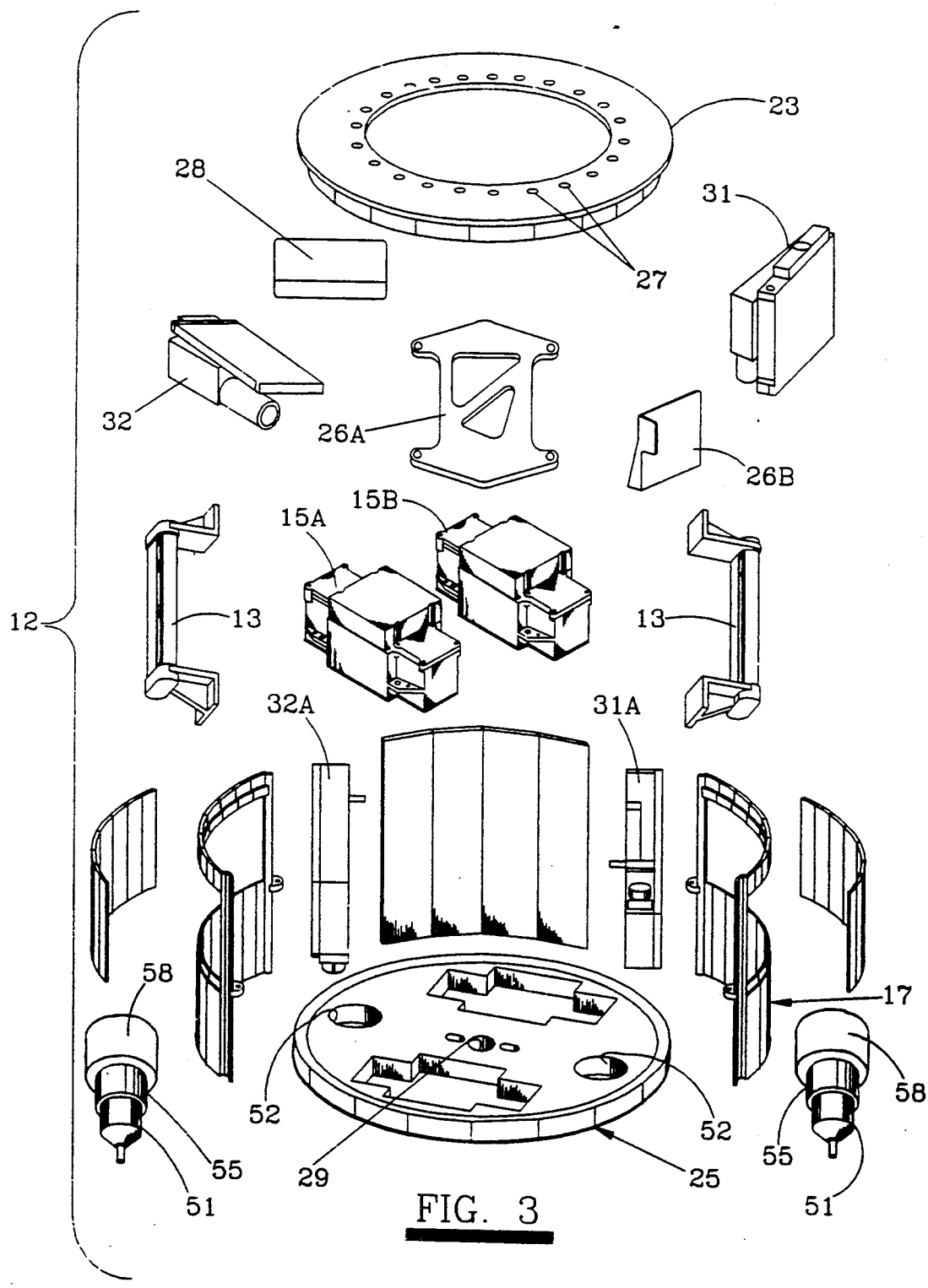
FIG. 3 is an exploded view showing the principal components of the electromagnetic end effector of the preferred embodiment of the invention.

The electromagnetic attachment mechanism 12 as shown in FIGS. 2 and 3, includes a pair of electromagnets 15A,15B (FIG. 3) which are mounted in a generally cylindrical housing 16 (FIG. 2) with their magnetic pole plates 21,22 (shown in FIGS. 2 and 5) exposed at the bottom thereof which, when the electromagnets are energized, overpower the flexibility of the remote manipulator system by magnetic attraction of the target grapple plate and close the intervening air gap to effect contact with the grapple plate. As best seen in FIG. 3, the housing 16 includes a circular mounting plate 23 for connection to the end of the manipulator arm 11, a base plate 25 which is appropriately apertured for accommodating the pole plates of the electromagnets, and a generally cylindrical side wall 17. A plurality of bolt holes 27 are provided in the mounting plate 23 for accommodating its connection to the end of the manipulator arm. The base plate 25 is also provided with a central axial opening 29 which accommodates the field of view of an on-axis centerline video camera 31, shown in FIG. 3, which is mounted in the housing 16. A right angle camera 32 is also mounted in the housing 16 in a manner such that its focal axis is disposed in a radial direction of the housing 16 and at an intersecting right angle relationship with the focal axis of the centerline camera 31. The right angle camera 32 views through a opening 33 provided in the side of the housing 16. The cameras are used for targeting and alignment procedures in a manner to be hereinafter described and may therefore be preset to a fixed focus distance. The lens apertures may also be preset. The application of the centerline camera is primarily for alignment and docking to a target object whereas the right angle camera is used for manipulating the target object in order to accomplish a specific task.

In FIG. 3 wherein the principal components of electromagnetic attachment mechanism 12 are shown in exploded view, it will be seen that the cylindrical housing wall 17 comprises several parts which are clamped or otherwise mounted between the mounting plate 23 and base plate 25. For easy access, portions of the wall are designed to be readily removeable. A pair of handles 13 may be affixed to the housing wall 17 at diametrically opposed locations and serve primarily as aids to an astronaut in extravehicular activity in maneuvering the attachment mechanism 12. In addition to the electromagnets 15A,15B and cameras 31,32, the mechanism 12 is also provided with camera electronic units 31A,32A, camera mounting plates 26A,26B and a backup battery pack 28. The control circuits for controlling the operation of the electromagnets and cameras are not shown in FIG. 3 but are instead illustrated in block diagram form in FIGS. 11, 12 and 13.

In the preferred embodiment, the electromagnetic attachment mechanism 12 comprises two electromagnets 15A,15B, each having a U-shaped three piece core 24 of magnetically soft material, such as Permendur, and three separate coils wound thereabout. For each electromagnet, one of the three coils is a high powered pull-in coil which produces an appreciable attractive force across a large air gap, and which is adapted to be automatically switched off by the preload indication system (to be hereinafter described) after grapple has been achieved. The other two are hold-in coils and are similar low current coils, with each producing sufficient magnetization to saturate the core and thus develop the full rated holding performance of the electromagnetic attachment mechanism 12. The two hold-in coils are connected to separate power sources for redundant operation. Once grapple is achieved and the pull-in coil is de-energized, the holding coils remain energized to maintain the magnetomotive force. If one of the holding coils should fail, the other holding coil has sufficient field intensity to hold the payload.

Figure 5:
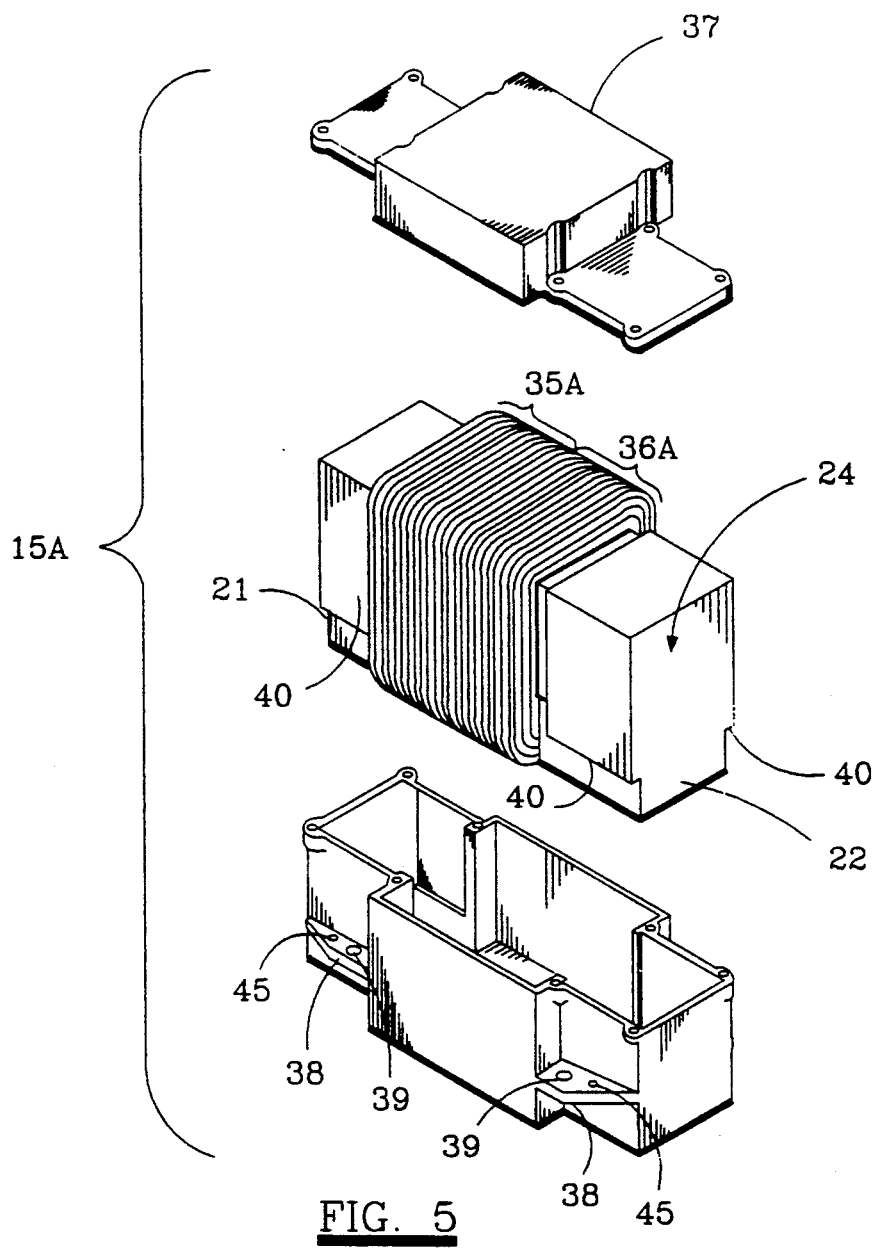
FIG. 5 is an exploded view in perspective of one of the electromagnets of the end effector of FIG. 2.
Figure 6:
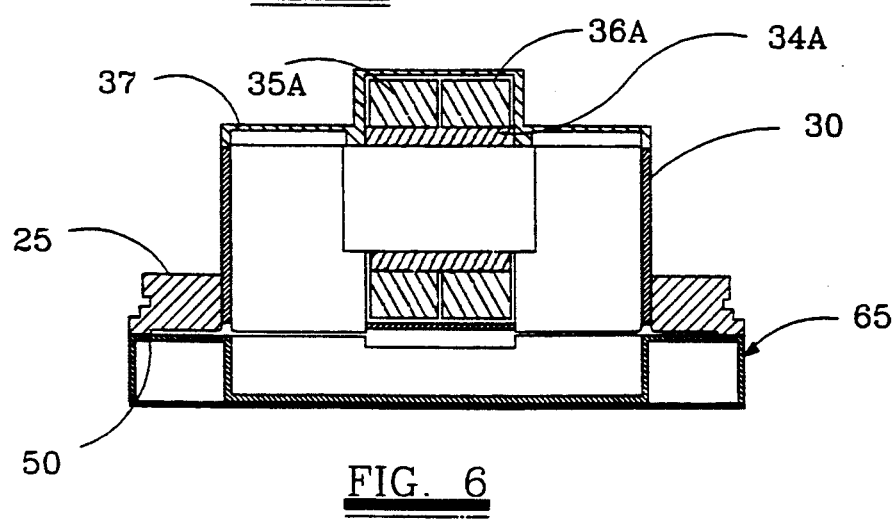
FIG. 6 is a section view through one of the electromagnets as mounted in the end effector of FIG. 2, showing its orientation with respect to a grapple fixture affixed to a target object after grapple has been accomplished.

As shown in FIGS. 5 and 6, an assembly of an electromagnet, such as electromagnet 15A, comprises the magnet core 24 with end poles 21,22, a pull-in coil 34A, FIG. 6, and a pair of holding coils 35A,36A. Each electromagnet is encased in a housing 30 with a cover 37 and four flanges 38 on the sides thereof whereby the housing may be fastened to the base plate 25 by means of bolts 39 through bolt holes provided in the flanges 38. The bottom wall of the housing 30 is suitably apertured such that the pole pieces 21,22 extend therethrough with downward facing shoulders 40 of the pole pieces supported on the floor of the housing 30 and the pole faces exposed and located externally of the housing 30.

Both electromagnets 15A,15B are independently mounted on a spring suspension system in such a way that the poles move slightly toward the grapple fixture during the grapple process, which motion is detected by optic switches as an indication of preload. To insure that the electromagnet poles must move to effect a contact with the grapple fixture, the bottom of the base plate 25 is provided with an annular rim or edge surface 50 which first contacts the grapple fixture and maintains the rest of the base plate from contact with the grapple fixture by a clearance gap of approximately 0.02 inches. Accordingly, the pole pieces of the electromagnets are required to move outwardly through the base plate 25 in order to effect a contact with the grapple fixture. It is therefore to be seen that the use of the spring suspension system does not reduce the attractive force, but rather ensures that a preload exists across the grapple interface. The independent spring loading for the magnet poles also provides an adjustment capability in the event that a foreign object, such as a meteoroid is present between the strike plate and the magnet pole.

Figure 10A:
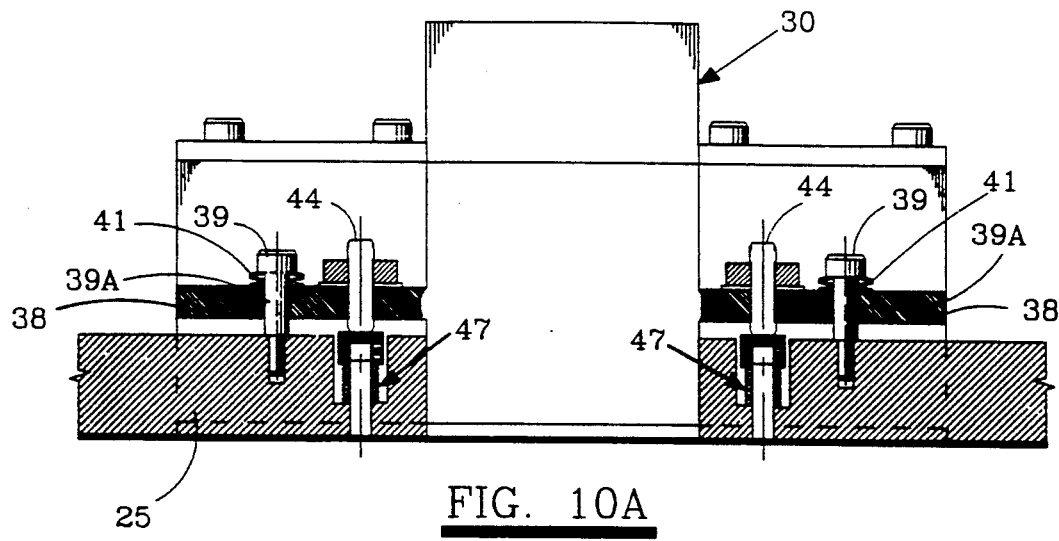
FIG. 10A is a view showing a preload spring arrangement employed in the mounting of an electromagnet assembly on the base plate of the end effector of the invention.
Figure 10B:
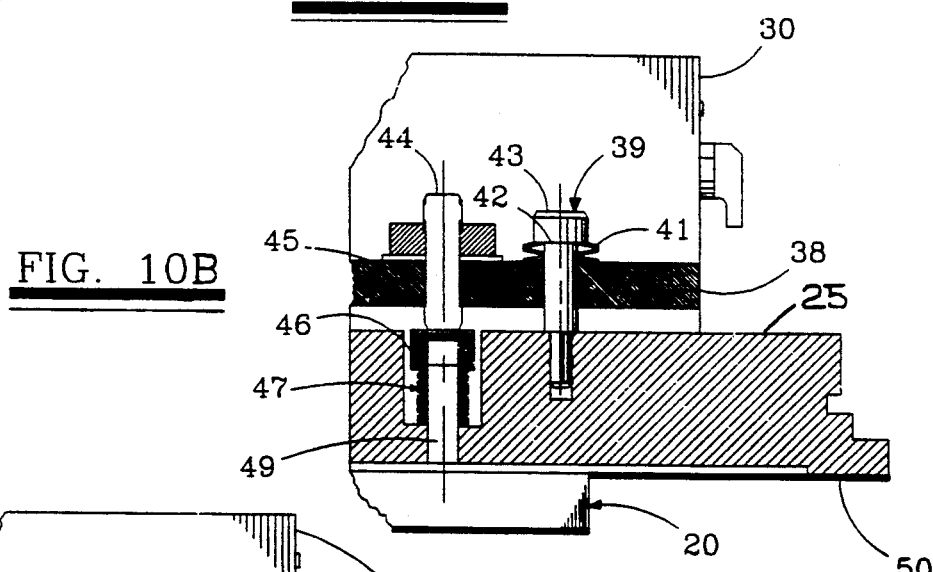
FIG. 10B is an enlarged view showing details of the preload spring arrangement of FIG. 10A in the condition prior to grapple.
Figure 10C:
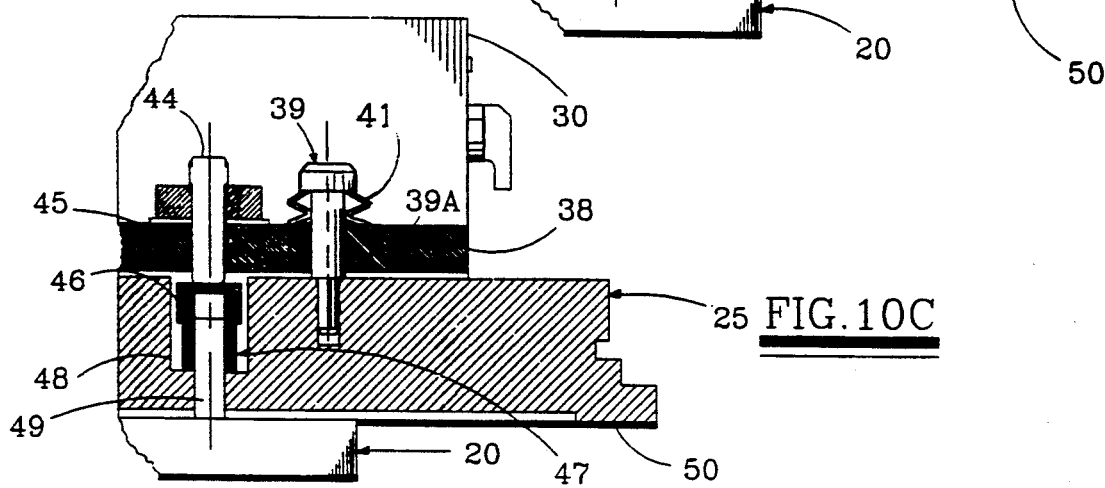
FIG. 10C is a view similar to FIG. 10B but showing the preload spring arrangement in the condition after grapple.

The spring suspension and preload system for an electromagnet 15A or 15B is shown in FIGS. 10A, 10B and 10C. The bolts 39, which fasten the electromagnet housings to the base plate 25 are provided with shanks having a threaded end portion for accommodating connection in threaded holes provided in the base plate 25. Each shank also includes a smooth shank portion 39A which is slidably moveable with respect to the flange 38 through which it extends. An assembly 41 of conical shaped spring washers is sleeved about the smooth shank portion of the bolt 39 and provides a rebound spring capability for the electromagnet by engaging at one end the upper surface of the flange 38 and at its other end the downward facing shoulder 42 of the bolt head 43, as shown in FIG. 10B. The electromagnet housing 30 and its flanges 38 are maintained in non-contact spaced relation to the base plate 25 by preload adjustment screws 44 each of which is externally threaded for axial movement through a bore 45 in flange 38. The end of each screw 44 is formed with a flat surface which engages the top surface of a cap member 46 which is supported on a stack of belleville spring washers 47. The washers 47 are seated in a bore 48 in the base 25 and sleeved about a post 49 which is press fit in a reduced diameter section of the bore 48 in coaxial relation therewith. An axial adjustment of the screw 44 controls the amount of clearance or built-in air gap between the magnet housing flanges 38 and the base 25 when the electromagnets are de-energized and also the amount of preload to be applied by the springs 47 when the electromagnets are energized and move outwardly of the attachment mechanism housing 16 through the openings in the base 25 to contact the strike plate 65 of the grapple fixture 20. When the contact is made, the air gap between the flanges 38 and base 25 is narrowed but is not closed. For each electromagnet there are four such preload adjustment screws, each with its own associated stack of spring washers 47.

In the process of grappling with an associated outward movement of the magnets, the preload system gives positive indication in the TV camera field of view that there is a magnet holding force to a payload and that the grapple attractive force is at least equal to the specified value of the preload.

It is also to be noted that the belleville spring washers 47 are arranged in a "parallel-series" manner wherein the springs in parallel nesting arrangement determine the force characteristic and the springs in series determine the deflection characteristic. A suitable spring material is 302 stainless steel or spring steel 1074.

The grapple fixture 20 shown in FIG. 1 and in detail in FIG. 7 is suitable for attachment to almost any payload. The fixture comprises a base 60, shown in FIGS. 1 and 7 to be of generally hexagonal form, but which could be circular or provided with other designs for accommodating its integration into a specific payload. The base 60, of a light weight material such as aluminum, is provided with alignment pin holes or sockets 61 which are spaced and sized to snugly accommodate the alignment pins 51 mounted on the housing of the attachment mechanism 12. The base 60 is also provided with bolt holes 63 adjacent its periphery for bolting to the payload. It is also provided with a central rectangular recess 64 which receives therein the ferrous strike plate 65. The strike plate material must be magnetically soft and for maximum performance in load critical applications, a ferrous material capable of high flux density such as Permendur, a trade name of Allegheny Ludlum Corporation, is a preferred material. The four corners of the strike plate 65 are raised areas or "strike poles" 66 which are relatively located to register with the four pole plates of the electromagnets when the attachment mechanism is aligned with the grapple fixture. A visual alignment aide 18 which comprises a mirror 67 covers the strike plate except for the raised areas 66. The mirror 67 is provided with a target pattern in the form of perpendicular cross hair markings 19 and a central hole 68 corresponding to the intersection of the markings 19 for allowing viewing therethrough by the centerline camera 31 after a grapple is achieved. The mirror, which could be a polycarbonate resin such as LEXAN or a highly polished stainless steel, is polished to the point of producing a good spectral reflection and is fastened to the strike plate 65 in suitable fashion, as by an epoxy glue or bolts (not shown). A bottom cover 62 is provided for the strike plate 65 and includes bolt holes 69 for bolting thereto. The strike plate is retained in the base 60 by the cover 62 when the base 60 is bolted to the payload.

It is important that the soft magnetic material used for the strike plate cannot become a permanent magnet in the conventional sense since permanent magnetization of the strike plate could prevent a release. While such soft magnetic material, Permendur for example, does have magnetization properties such that a high field strength is retained at zero magnetizing force, an extremely small demagnetizing force is required to drive the magnetizing force to zero. This demagnetizing force is provided in the attachment mechanism 12 by the small, built-in air gap, so therefore there cannot be any detectable residual magnetism in the strike plate.

Figure 4:
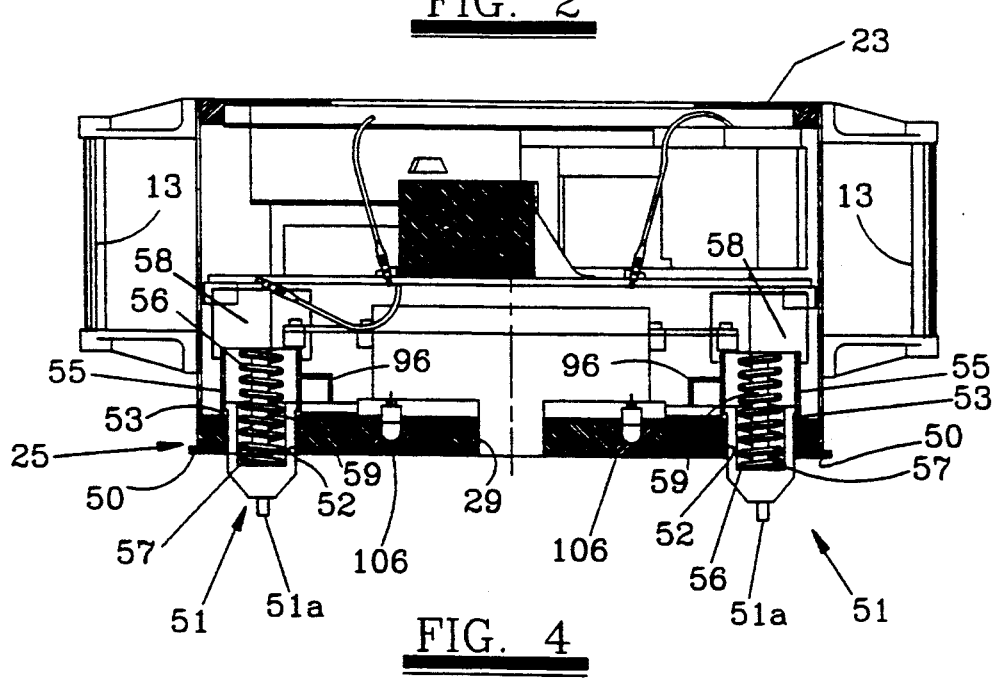
FIG. 4 is a section view as taken along the section line 4—4 in FIG. 2.

As shown in FIGS. 2 and 4, the electromagnetic attachment mechanism 12 is also designed with two spring-loaded alignment pins 51 which project through accommodating openings 52 as best seen in FIG. 3, which are provided through the base plate 25. The two spring-loaded alignment pins 51 ensure accurate end effecter/grapple plate alignment and provide increased capability for withstanding shear and torsion loads. As shown in FIG. 4, each alignment pin 51 is of circular cylinder configuration and provided at its external end portion with a frusto-conical bevelled surface to facilitate the entry of the pins 51 in alignment pin holes or sockets 61 in the grapple fixture 20. Each pin 51 is formed with a flanged end 53 of larger diameter than the opening 52 and which is adapted for sliding axial movement in a cylindrical housing 55 which is closed at one end and fastened at its open end to the base plate 25 by welding or bolts about the periphery of the opening 52. Each pin 51 is biased towards an outermost position by a coiled spring 56 which is coaxially received in an axial blind bore 57 of the pin with one end abutting the base of the bore 57 and its other end in abutting engagement with the closed end of the cylinder housing 55. Optic switches 96 are positioned adjacent the pins 51 in suitable fashion to detect a depression of either one or both of the alignment pins 51 which compresses the biasing spring 56 and signals to an operator that there is contact between the end effecter and the payload. Each pin 51 may be provided with a projecting tab (not shown) for cooperation with a switch 96.

The targeting and alignment system uses the centerline TV camera 31 viewing its own image in the mirror 67 on the grapple fixture 20 to achieve alignment in all six axes. The TV camera 31 and an associated TV monitor 70 are both provided with alignment marks for use with mirror/cross hair assemblies located on the object to be grappled or areas to be targeted in achieving an alignment. The docking alignment system is shown in U.S. Pat. No. 4,890,918 incorporated herein and made a part hereof.

As shown in FIG. 7, a mirror surface which serves as a target mirror 67, is placed on the ferrous strike plate 65. The pair of perpendicular cross hair lines 19 are symmetrically placed on the mirror surface, by coating or abrading the mirror surface, one cross hair line of which is in collinear relation with the centers of the alignment pin sockets 61. On approaching the payload object, the operator observes a TV monitor 70 to direct alignment and docking maneuvers. The image from the camera 31 is displayed on the monitor 70 which includes a conventional display screen, shown in FIG. 8A, with perpendicular cross hairs 71,72. In order for the camera 31 to see its image in the mirror, the optical axis of the camera must be perpendicular to the mirror. This condition is shown in FIG. 8D wherein the circular camera lens 73 is shown centered with respect to the mirror target pattern. With the optical axis of the camera thus aligned with the designated centerpoint of the mirror, two dimensional translational alignment is achieved. When the camera 31 is pointed at the mirror 67, but its optical axis is not perpendicular to the mirror and strikes a location other than the center of the mirror, the monitor 70 may display an image as shown in FIG. 9B where the camera lens is offset from the center of the target pattern. The operator may then control the manipulator arm 11 in "yaw" and "pitch" and in the x-y plane so that the optical axis 75 is perpendicular to the mirror and strikes the center of the mirror 67 whereby the centerpoints of the mirror target pattern and the monitor cross hairs are coincident on the monitor.

Rotational alignment of the camera and mirror is achieved by "rolling" the manipulator arm such that the cross hairs of the mirror are parallel to the cross hairs of the monitor. The alignment pins 51 are thus aligned with the alignment pin sockets 61. By closing the range to where the camera lens image 73 matches the field size of the monitor, a capture of the target object can be achieved by energizing the pull-in coils of the electromagnets in a manner as will be hereinafter described.

Figure 13:
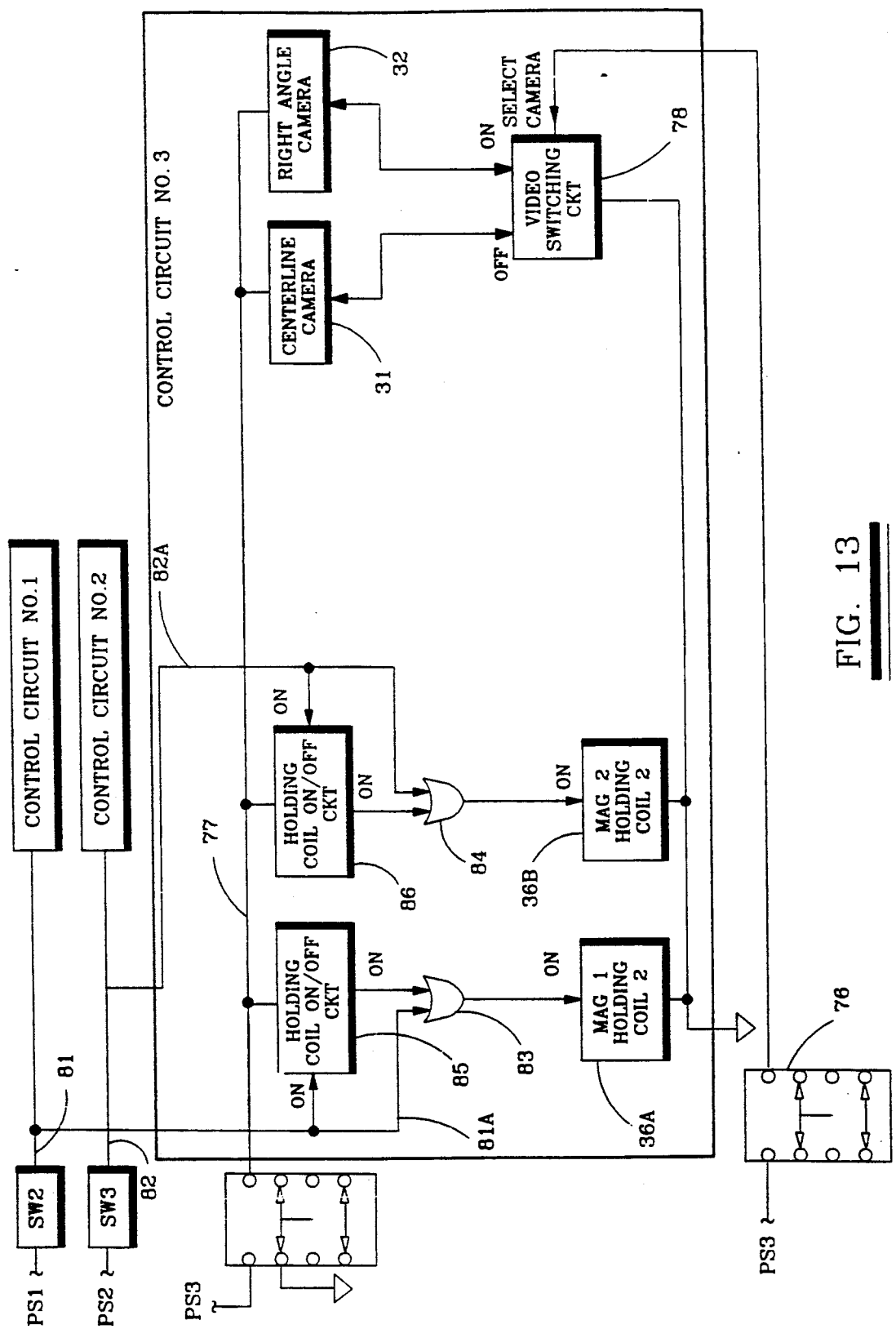
FIG. 13 is an electrical block diagram similar to FIG. 11 but showing details of the back-up control circuit.

When the operator has maneuvered the manipulator arm 11 in proximity to the target object to be grappled, it becomes necessary to use the centerline camera 31 to perform the necessary alignment and docking maneuvers. The operator will then throw a switch SW1, shown in FIG. 11, on a switch panel in the ORBITER spacecraft. SW1 activates MEE circuit #3 which controls the cameras. Power source PS3 in the ORBITER is coupled through a conductor cable 77 to the cameras 31,32, as shown in FIG. 13. The operator can then operate a selector switch 76 which controls a video switching circuit 78 to turn on the camera 31. The selector switch control 76 can also be used to turn on the right angle camera 32 if so desired. The video switching circuit 78 and cameras 31,32 are included in control circuit No. 3, shown in FIGS. 11. Control circuit No. 3 also controls one holding coil (for example 36A and 36B) of each electromagnet (15A and 15B), respectively. The control circuit No. 3 (FIG. 11) in the electromagnet attachment mechanism 12 serves as a back-up control circuit to a control circuit No. 1. Control circuit No. 1 controls the pull-in coil 34A and remaining holding coil 35A of electromagnet 15A. Control circuit No. 3 and is also a back-up to a control circuit No. 2 which controls the pull-in coil and remaining holding coil of the electromagnet 15B.

The operator, by use of the targeting and alignment system previously described, will then align the magnetic attachment mechanism 12 with the grapple fixture 20 and close the range with the manipulator arm 11 to where a grapple and capture of the target object is possible. The operator then energizes the pull-in coils of both electromagnets by closing switches SW2 and SW3 on the switch panel in the ORBITER which close circuit breaker switches 79,80, respectively, to connect additional power sources PS1 and PS2 in the ORBITER to the control circuits No. 1 and No. 2, as will be noted by reference to FIG. 11. As also shown therein, the power source PS1 is connected by means of a conductor 81 with the control circuit No. 1 and also to the back-up control circuit No. 3 by a conductor 81A which is coupled to conductor 81. The power source PS2 is connected by a conductor 82 with control circuit No. 2 and also to the back-up control circuit No. 3 by a conductor 82A which is coupled to conductor 82.

Figure 12:
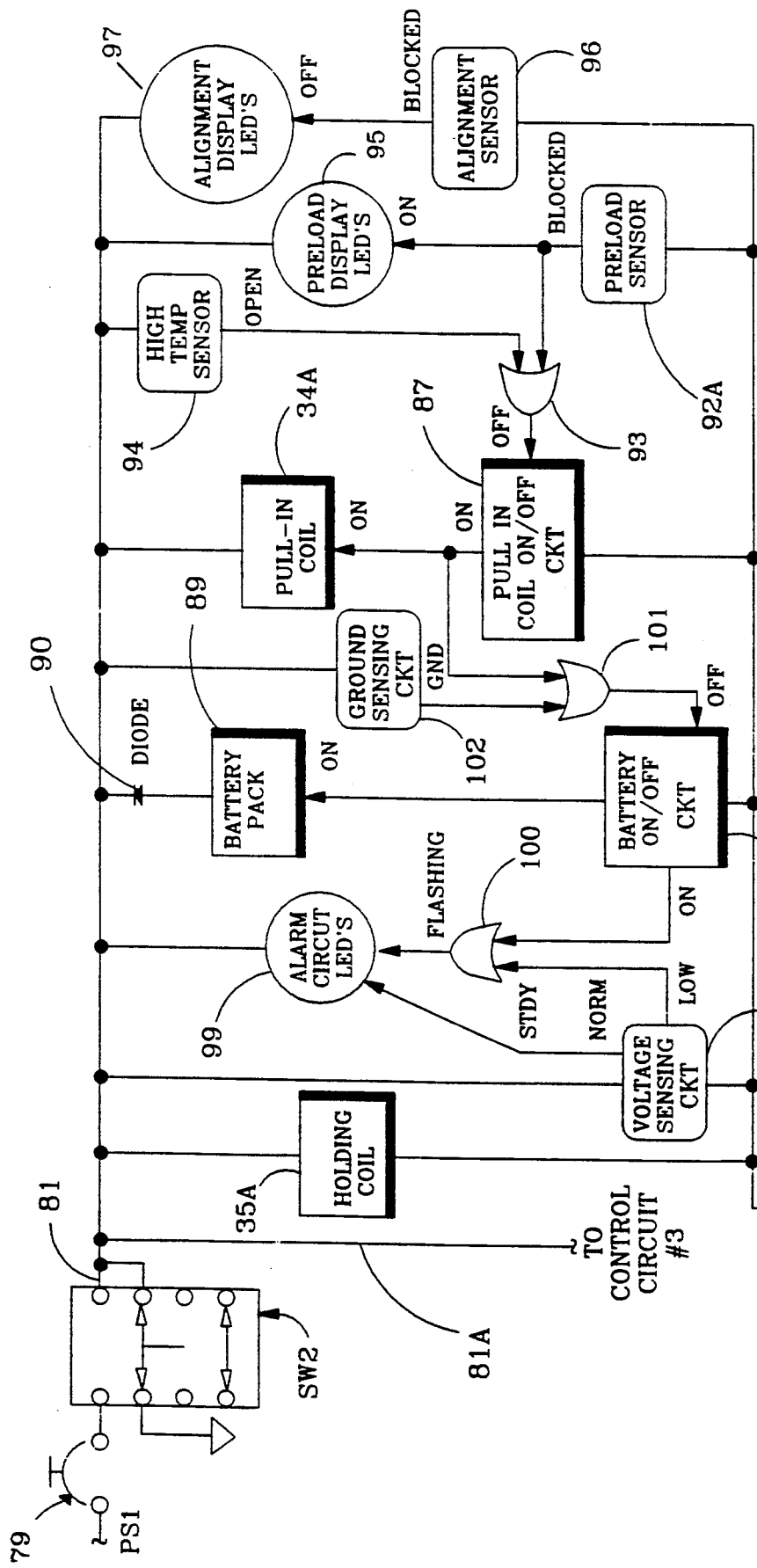
FIG. 12 is an electrical block diagram of a control circuit for one of the electromagnets of the invention.

In control circuit No. 1, shown in more detail in FIG. 12, the pull-in coil 34A and holding coil 35A of electromagnet 15A are connected in parallel between conductor 81 and ground. Thus, when power is applied to control circuit No. 1 by closure of the switch SW2, pull-in coil 34A and holding coil and 35A are simultaneously energized. Similarly, in control circuit No. 2, the pull-in coil and holding coil of electromagnet 15B are connected in parallel between conductor 82 and ground and are simultaneously energized by closure of the switch SW3. It is also to be noted that simultaneously with the power being delivered to the control circuits No. 1 and No. 2 it is also delivered to the back-up control circuit No. 3 and the other two holding coils 36A,36B by means of the conductors 81A, 82A respectively.

With reference to FIG. 13, it will further be seen that the power applied to control circuit No. 3 through conductor 81A is applied to one end of the holding coil 36A of electromagnet 15A as one input to OR gate 83, which has one input terminal coupled to the power conductor 81A. The power applied to control circuit No. 3 through conductor 82A is delivered to holding coil 36B of electromagnet 15B as one input to OR gate 84. The other ends of the coils 36A,36B are at electrical ground.

Control circuit No. 3 (FIG. 13) also includes a holding coil ON/OFF circuit 85 powered by PS3 through connector 77 and which is connected at its output terminal to the holding coil 36A via the other input to OR gate 83. Power is also provided by power source PS3 through connector 77 to centerline camera 31. The power source PS3 is also connected by conductor 77 to the input terminal of a second holding coil ON/OFF circuit 86 which connects at its output to the holding coil 36B via the other input to OR gate 84. The ON/OFF circuits 85,86 are in OFF condition until turned on at the same time power is delivered to the control circuits No. 1 and No. 2 and to control circuit No. 3 by the power conductors 81A,82A which are coupled to second input terminals of the ON/OFF circuits 85,86, respectively. It will therefore be noted that there are two power sources which energize each of the holding coils 36A,36B.

In control circuit No. 1 (FIG. 12), the holding coil 35A of electromagnet 15A is connected at one end to the power conductor 81 and to ground potential at the other end. The pull-in coil 34A which also connects to the power conductor 81 is coupled to ground through a pull-in coil ON/OFF circuit 87 which is turned on as power is applied to the control circuit No. 1 through conductor 81. A battery pack 89, comprising two 9 volt alkaline batteries connected in cascade to deliver 18 volts, is also connected to the conductor 81 through a diode 90 which blocks current flow to the battery pack from the conductor 81. The battery pack 89 is connected to ground through an ON/OFF circuit 91. When the pull-in coil 34A is energized, the battery ON/OFF circuit 91 is OFF.

As previously noted, the pull-in coils when energized, exert a strong attractive force for effecting a grapple. When the pole faces of either of the electromagnets (15A for example) contact the strike plate 65, the pull-in coil (34A) is automatically de-energized by an electrical signal from preload sensor (92A) in the control circuits (No. 1). The other electromagnet (15B) is similarly controlled by control circuit No. 2. Each preload sensor is an optical switch which detects the narrowing of the air gap between the electromagnet housing flanges 38 and the base plate 25 when the electromagnets move outwardly of the housing 16 to contact the strike plate 65 and effect a grapple. In control circuit No. 1 the preload sensor signal is coupled to an input terminal of an OR gate 93, the output of which is coupled to the pull-in coil ON/OFF circuit 87 to turn this circuit OFF and de-energize the pull-in coil. The target object is then held by the attractive force of the four holding coils in the two electromagnets, each holding coil of which produces sufficient magnetization to saturate the core.

As a precaution in the event an operator should leave the pull-in coil 34A energized for a relatively long time, inadvertent or otherwise, without effecting a grapple, the resultant overheating of the pull-in coil will cause a high temperature sensor 94 coupled between the conductor 81 and OR gate 93 to transmit a signal to the pull-in coil ON/OFF circuit 87 through the OR gate 93, which turns the circuit 87 OFF and de-energizes the pull-in coil.

A visual display 95 of light emitting diodes coupled to the preload sensor 92A and conductor 81 is also activated by an output signal from the preload sensor 92A to indicate when preloading has been accomplished. An alignment sensor 96, also an optical switch, which is connected in parallel with the preload sensor 92A is adapted to signal a visual display 97 of light emitting diodes when the alignment pins 51 are properly aligned with the grapple fixture 20. The control circuit No. 2 which controls electromagnet 15B includes similar components and sensors which function in the same manner a described in the operation of control circuit No. 1 in order to de-energize pull-in coil 34B. Likewise, the description herein of other components and their operation in control circuit No. 1 is equally applicable to control circuit No. 2.

In control circuit No. 1 (FIG. 12) voltage sensing circuit 98 connected between the conductor 81 and ground continuously monitors the power supply voltage. The voltage sensing circuit 98 is provided with two output terminals, one of which is connected directly to a visual display 99 of light emitting diodes and supplies a signal to maintain the display in a steady state when the power supply is at a normal level. A second output terminal of the voltage sensing circuit 98 is coupled to the visual display 99 through an OR gate 100 and provides a signal thereto which flashes the display 99 whenever the sensed voltage drops below a predetermined level.

When the pull-in coil 34A is de-energized by the preload sensor, this condition is signalled to the battery ON/OFF circuit 91 through an OR gate 101 which is coupled between the ON/OFF circuit 91 and the low voltage end of the pull-in coil. Although the battery ON/OFF circuit 91 comes on instantly, the batteries 89 do not discharge through the diode 90 since the voltage at the pull-in coil 34A is higher than the battery voltage. However, the battery pack will discharge current through the diode 90 if the voltage on connector 81 should drop below 18 volts.

Also included in control circuit No. 1 is a ground sensing circuit 102 which is coupled between the power conductor 81 and the battery ON/OFF circuit 91 through the OR gate 101. The ground sensing circuit 102 signals the battery ON/OFF circuit 91 to turn the battery pack off when the astronaut operator switches his ORBITER vehicle power supply PS1 to ground and intentionally removes power from the control circuit.

It is to be understood that the control circuit No. 2, which controls the electromagnet 15B, but is otherwise identical to control circuit No. 1, functions in the same manner.

In most applications, it will be desirable to transfer electrical power across the grapple interface. This can be done, for example, by providing electrical connectors 104,105 on the base plate 25 of the attachment mechanism and the strike plate 65, respectively. Lights 106 may also be installed in the base plate 25 to provide illumination for alignment and docking.

It will be seen that an electromagnetic attachment mechanism and end effector is disclosed herein which is two fault tolerant in both grapple and release. The attachment mechanism 12 of the invention utilizes two electromagnets, each with a pull-in coil and two holding coils and all coils being provided with an available back-up power source. The pull-in coils are energized to overcome the air gap to target and the spring force of a preload system which assures that the grapple attractive force is at least equal to a specified value. The pull-in coils are also automatically de-energized immediately after grapple to reduce the overall coil heat dissipation.

While the electromagnetic attachment mechanism 12 has heretofore been described as particularly useful for grappling an object which is already provided with a grapple fixture, there are some instances where the target object, such as an orbiting space satellite, may not be equipped with a grapple fixture 20 and it therefore becomes necessary that the grapple fixture be carried to the target object to be affixed thereon. The attachment mechanism 12 can then be used to attach a grapple fixture 20 on the end of the mechanism 12 and the grapple fixture 20 carried to the target object by maneuvering of the spacecraft and operation of the manipulator arm 11. For such applications, each pin 51 may be provided with a drive tip 51a which, when the grapple fixture is attached by the mechanism 12, is placed in cooperative engagement with the slotted head of a fastening bolt 154 carried on the grapple fixture. Two such bolts 154, shown in FIG. 7, are seated in the pin sockets 61 in the grapple base 60. Bi-directional d.c. motors 58, which are mounted atop the pin housings 55 as shown in FIG. 4, may then be employed to drive the alignment pins 51 in a selected direction of rotation which would fasten the bolts 154 in accommodating bores provided on the target object. Each motor 58 is connected to a pin 51 by a drive shaft 59.

In a typical operation which involves carrying the grapple fixture to the target, the manipulator arm with magnetic end effector 12 attached is maneuvered to pick up a grapple fixture 20, equipped with fastening bolts 154, from a supply stack of grapple fixtures 20 carried in the bay of the orbiter spacecraft. The spacecraft and the manipulator arm 11 may then be controlled to place the magnetic end effector 12 in proximity to the target object and contact made with the target by using a targeting and alignment system as previously described. The bolts 154 may be driven by the motors 58 into accommodating threaded bores provided in the target object to fasten the grapple fixture 20 thereon.

Figure 14:
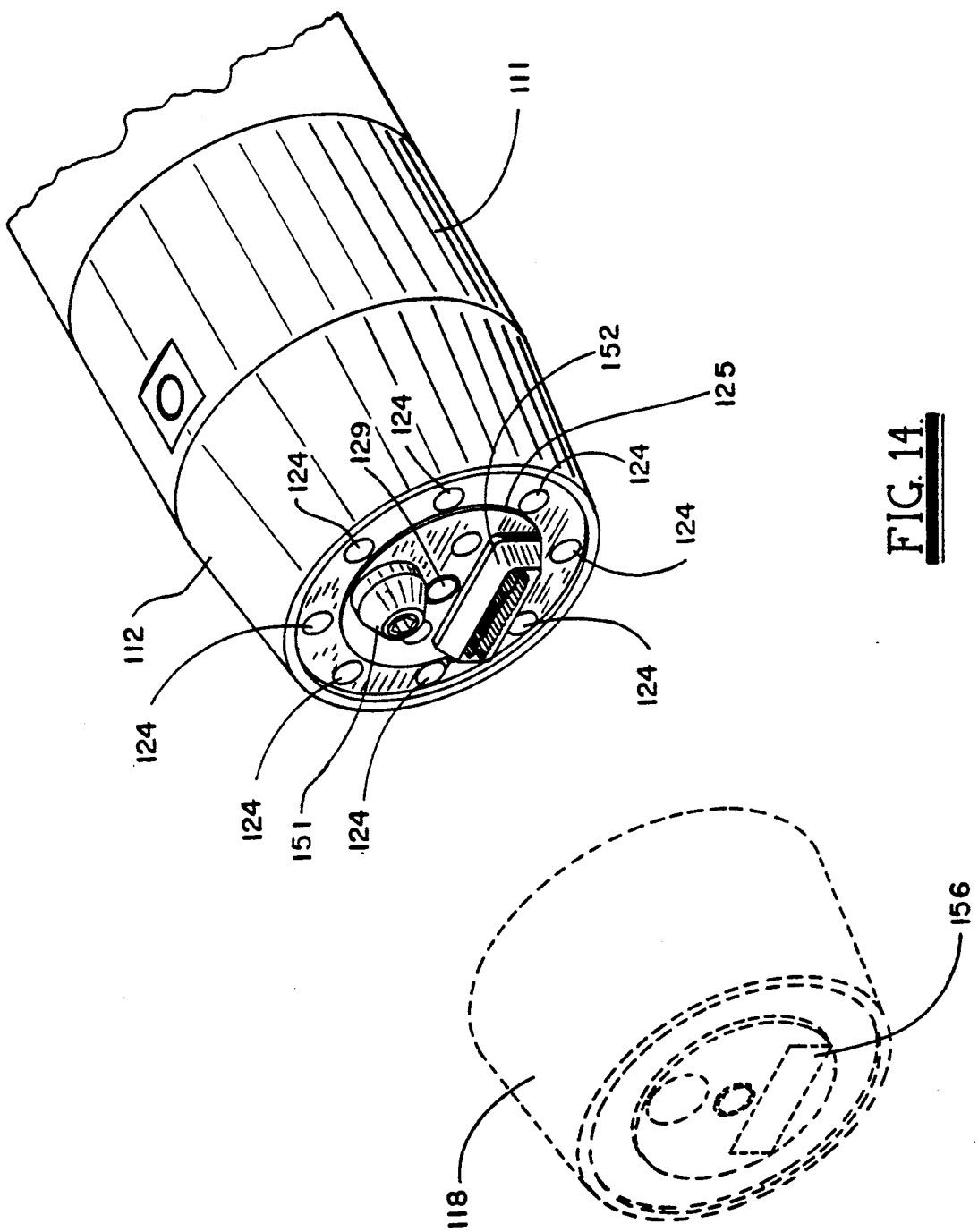
FIG. 14 is an exploded view in perspective of another form of electromagnetic end effector of the invention shown connected to the arm of a remote manipulator system and in proximity to a grapple fixture which includes a bucket-like receptacle.

A further embodiment of the invention, which can be more easily constructed to smaller size than the magnetic attachment mechanism 12, is represented by the electromagnetic attachment mechanism 112 shown in FIG. 14 to be operably connected to the end of a manipulator arm 111. The attachment mechanism 112, further details of which are shown in FIG. 15 and FIG. 16, includes a housing 116 with a frusto-conical side wall 117, eight electromagnets 115 and a base plate 125 at the end thereof which is adapted to interface with a target object, to which a grapple fixture is adapted for seating in the base of a bucket-like receptacle 118. The receptacle 118 is attached to a target object (not shown).

The base plate 125 is mounted by supporting braces such as the brace 153 (FIG. 16), within the housing 116 and is provided with a central axial opening 129 for accommodating the field of view of an on-axis centerline video camera such as the camera 31 in the attachment mechanism 12.

A principal difference between the electromagnetic attachment mechanism 112 and the embodiment of the invention represented b electromagnetic attachment mechanism 12 is in the number and configuration of the electromagnets employed therein. The mechanism 112 utilizes eight electromagnets 115 which are of circular cylinder configuration with cylindrical magnetic cores 124. The eight electromagnets 115 are mounted in eight cylindrical bores 126 which are formed in an annular structure comprising a cylindrical ring 127 of soft magnetic material, such as Permendur, which is bonded atop annular flange 138, as is an aluminum ring 128 of similar configuration. The bores 126 extend between the rings 127,128 in parallel to one another and the central axis 130 of the housing 116. Each electromagnet 115 includes a magnetic core 124 about which is wound a pull-in coil 134 and a single holding coil 135 overlapped thereon. Each bore 126 is formed with one end adjacent an annular shoulder 136 with a central opening 137 through which the core 124 extends and at which one end of each of the coils 134,135 is also disposed adjacent.

The aluminum ring 128 is provided with an internal annular flange 138 which serves a similar function to that of the magnet housing flange 38 in attachment mechanism 12. Preload adjustment screws 144 and fastening bolts 139 are mounted on the flange 138 in cooperation with the base 125 to provide a spring suspension and preload system corresponding to the spring suspension and preload system provided for attachment mechanism 12. The screws 144 and bolts 139 are identical in configuration and function to the screws 44 and bolts 39 of the mechanism 12.

The mechanism 112 is provided with a single alignment pin 151 which extends through an opening in the base 125 and is adapted for limited axial movement therethrough. The pin 151 is fixed to the drive shaft 159 of a bi-directional motor 158 and is adapted to be driven thereby in a selected direction of axial rotation. The motor 158 is mounted in the mechanism housing 116 by braces 153 connecting thereto in appropriate manner (not shown). The alignment pin 151 is identical to the alignment pin 51 in configuration and mounting except for the provision of a hexagonal socket 141 which is formed in the tip thereof and adapted for cooperation with the hexagonal head of a fastening bolt corresponding in function to that of the bolt 154 shown in FIG. 7.

Although the attachment mechanism 112 is provided with only one alignment pin 151, it is also provided with an electrical connector 152 which is fixed to the outer surface of the base 125. The connector 152 is not only adapted for electrical connection with a mating electrical connector 156 to be provided on the grapple fixture of the target object, it also serves the function of a second alignment pin. Lights (not shown) may also be installed in the base 125 to provide illumination for alignment and docking.

Figure 11:
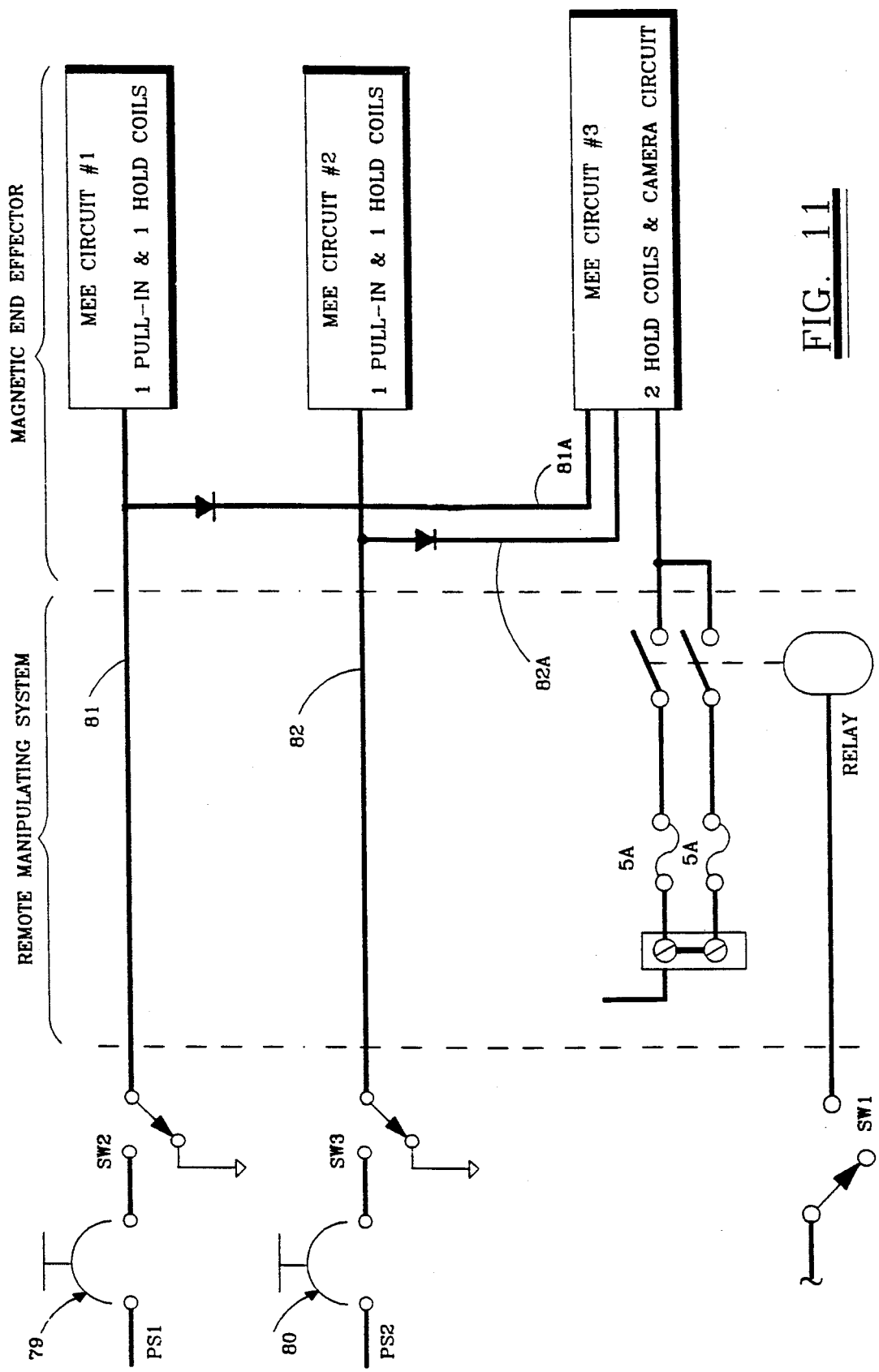
FIG. 11 is an electrical power diagram showing the interconnection of power sources with two primary control circuits and a back-up control circuit used in the invention.

As best seen in FIG. 15, the attachment mechanism 112 is provided with eight electromagnets with pole pieces of like polarity disposed in diametrically opposed relationship. The holding coils 135 are adapted to be electrically connected in four pairs and the pull-in coils 134 in two groups for interconnection and cooperation with control circuits corresponding to the control circuits Nos. 1,2 and 3 provided for the attachment mechanism 12 which are shown in FIGS. 11, 12 and 13.

It is to be understood that the attachment mechanism 112 is provided with all the basic components of the attachment mechanism 12, including centerline and right-angle video cameras, optic switches for detecting depression of the alignment pin 151, and a targeting and alignment system such as shown in FIGS. 9A and 9B, which operates in identical fashion. However, the mechanism 112 further differs from the mechanism 12 in the shape of the housing in that a frustoconical housing 116 is provided which is adapted to be received in a frusto-conical receptacle 118 affixed to the target object. A grapple fixture similar to the grapple fixture 20 shown in FIG. 7 is adapted to be magnetically attached to the attachment mechanism 112 and carried thereon for attachment to the target object 114 by motor-driven bolts at a location in the bottom of the receptacle 118. The insertion of the electromagnetic attachment mechanism 112 in the receptacle 118 which is provided with an inner wall of corresponding frusto-conical configuration strengthens the grapple effected by the attachment mechanism 112 by providing resistance to forces acting perpendicular to the axis 130 of the mechanism 112.

It is to be noted that in the various embodiments, a further significant feature of the electromagnet attachment mechanism of the invention is that it is mechanically much less complicated than standard end effectors, since it does not have any moving parts which are required to effect a grapple. Also, a payload cannot become "stuck" on the electromagnetic end effector described herein, which is a possibility with standard end effectors, since in order to ungrapple a payload, only the electric power has to be removed. Accordingly, the need for extravehicular activity of an astronaut to effect a release or the provision of pyrotechnic devices for jettisoning of the remote manipular system is avoided.

It is also to be understood that the foregoing description of a preferred embodiment of the invention has been presented for purposes of illustration and explanation and is not intended to limit the invention to the precise form disclosed. For example, the grapple fixture could be formed from a single piece of polished stainless steel. The number of electromagnets and coils in the embodiments of the invention may also be other than described. It is to be appreciated therefore that various material and structural changes may be made by those skilled in the art without departing from the spirit of the invention.

I claim:

1. An electromagnetic attachment mechanism adapted for interfacing with a manipulator arm of a remote manipulator system, said attachment mechanism comprising:

a housing with a base plate at one end thereof;

at least one electromagnet mounted in said housing, said electromagnet comprising a U-shaped magnetic core with pole pieces at the ends thereof and a plurality of coils wound about said magnetic core between said pole pieces, said base plate having openings therethrough which are sized to accommodate said pole pieces; a spring suspension system having a bias mounting said electro-magnet in said housing with the pole pieces exposed by the openings in said base plate and adapted for movement through said openings when attracted to a magnetic strike plate included in a grapple fixture affixed to a target object in proximity to the attachment mechanism; means on said housing for maintaining said pole pieces in spaced relation to said strike plate when said base plate of the housing is directed into engagement with said grapple fixture to thereby establish a gap between said pole pieces and said strike plate;

means for energizing said coils whereby said electromagnet exerts an attractive force on said strike plate when in proximity thereto to cause said pole pieces to move through said base plate openings to contact and grip said strike plate and thereby impose a preload force of predetermined magnitude between said pole pieces and said strike plate; and preload sensor means for detecting the movement of said pole pieces in establishing the preload force and generating an electrical output signal indicative thereof.

2. An electromagnet attachment mechanism as set forth in claim 1 wherein said base plate is provided with a central opening and said attachment mechanism further comprises:

camera means having an optical axis mounted in said attachment mechanism housing with the optical axis fixed for viewing through said central opening;

monitor means for displaying images from the camera means and having a point optically fixed with respect to the optical axis of the camera means such that the monitor means will display a reflected image of the camera means and a visible pattern on a reflective surface of the grapple fixture on said target object when said grapple fixture is so provided whereby an operator may control the remote manipulator system to maneuver said electromagnetic attachment mechanism to align on the monitor means the reflected image of the camera means with the pattern on the grapple fixture to thereby align the attachment mechanism with said grapple fixture in preparation for effecting a grip.

3. An electromagnet attachment mechanism as set forth in claim 2 wherein said attachment mechanism is provided with alignment pins which are spring-loaded to project outwardly of said base plate and adapted for interconnection with sockets provided in the grapple fixture on the target object when the attachment mechanism is aligned for docking engagement with the target object preparatory to effecting a grip of the target object.

4. An electromagnet attachment mechanism as set forth in claim 3 further including alignment sensor means for sensing the depression of one or more of said alignment pins on contact with said target object and generating an electrical output signal in response to said contact; and display means responsive to the electrical output signal from said alignment sensor means for indicating said contact.

5. An electromagnet attachment mechanism as set forth in claim 1 wherein said electromagnet coils comprises a pair of holding coils and a pull-in coil for generating an attractive force sufficient to overcome the spring bias of said spring suspension system and cause said magnet pole pieces to move through said base plate to contact the strike plate on said grapple fixture to effect a grip and impose a preload force between said pole pieces and said strike plate; and means responsive to said preload sensor signal for automatically de-energizing said pull-in coil when said pre-load force has been established whereby the grip of the target object is maintained solely by the attractive force of said holding coils.

6. An electromagnet attachment mechanism as set forth in claim 1 wherein said attachment mechanism further includes alignment pins which are spring-loaded mounted to project outwardly of said base plate and adapted for interconnection with sockets provided in the grapple fixture on the target object when the attachment mechanism is aligned for docking engagement with the target object preparatory to effecting a grip of the target object, each said socket being provided with a bolt member seated therein;

motor means adapted for driving said alignment pins in a selected direction of axial rotation; and cooperative drive surfaces provided on said alignment pins and said bolt members whereby said bolt members may be axially rotated to fasten the grapple fixture to the target object by interconnection with bolt receiving members on said target object.

7. An electromagnetic attachment mechanism adapted for interfacing with a manipulator arm of a remote manipulator system, said attachment mechanism comprising:

a housing with a base plate at one end thereof;

a pair of electromagnets mounted in said housing, each said electromagnet comprising a U-shaped magnetic core with pole pieces at the ends thereof and a plurality of coils wound about said magnetic core between said pole pieces, said base plate having openings therethrough which are sized to accommodate said pole pieces;

a spring suspension system having a spring bias mounting said electromagnets in said housing with the pole pieces exposed by the openings in said base plate and adapted for movement through said openings when attracted to a magnetic strike plate included in a grapple fixture affixed to a target object in proximity to the attachment mechanism;

means on said housing for maintaining said pole pieces in spaced relation to said strike plate when the base plate of the housing is directed by said remote manipulator system into engagement with said grapple fixture to thereby establish a gap between the pole pieces and the strike plate;

an individual control circuit for each electromagnet;

first and second power sources connectable to said individual control circuits, respectively, for energizing said coils whereby said electromagnets exert an attractive force on said strike plate when in proximity thereto to overcome the spring bias of said spring suspension system and to cause said pole pieces to move through said base plate openings and said gap to contact and grip said strike plate and thereby impose a preload force of predetermined magnitude between said pole pieces and said strike plate;

preload sensor means in each said individual control circuit for detecting the movement of the pole pieces of the electromagnet controlled thereby and for generating an electrical output signal indicative of the preload force thereby established;

a back-up battery pack connected in each said individual control circuit as a redundant power source for each electromagnet; voltage sensor means in each said individual control circuit for sensing and providing a voltage drop signal for a voltage drop below a predetermined voltage level of the one of said power sources connected to said individual circuit; and means responsive to said voltage drop signal to automatically connect the battery pack to energize the electromagnet coils.

8. An electromagnet attachment mechanism as set forth in claim 7 wherein each said electromagnet comprises a pair of holding coils and a pull-in coil for generating an attractive force sufficient to overcome the spring bias of the spring suspension system and cause its pole pieces to move through said base plate to contact the strike plate on said grapple fixture and impose a preload force between said pole pieces and said strike plate; and means in each individual control circuit responsive to a preload sensor signal in said circuit for automatically de-energizing the pull-in coil of the controlled electro-magnet when said preload force has been established whereby the grip of the target object is maintained solely by the attractive force of said holding coils.

9. An electromagnet attachment mechanism as set forth in claim 8 further including a back-up control circuit which includes a single holding coil of each said electromagnet;

a third power source separate from said battery packs; and means for connecting said first, second and third power sources to said back-up control circuit for energizing said single holding coils.

10. An electromagnet attachment mechanism as set forth in claim 9 further including first camera means having an optical axis mounted in said attachment mechanism housing with the optical axis fixed for viewing through said central opening;

monitor means for displaying images from the camera means and having a point optically fixed with respect to the optical axis of the camera means such that the monitor means will display a reflected image of the camera means and a visible pattern on a reflective surface of the grapple fixture on said target object when said grapple fixture is so provided whereby an operator may control the remote manipulator system to maneuver the electromagnet attachment mechanism to align on the monitor means the reflected image of the camera means with the pattern on the grapple fixture to thereby align the attachment mechanism with the grapple fixture in preparation for effecting a grip; and a second camera means having an optical axis and mounted in said housing with the optical axis at a right angle to the optical axis of the first camera means, said housing being provided with an opening in the side for accomodating viewing of said second camera means through said side opening.

11. An electromagnet attachment mechanism as set forth in claim 10 wherein said first and second camera means are electrically controlled by said back-up control circuit;

a video switching circuit included in said back-up control circuit; and switch means for controlling said video switching circuit to selectively apply electrical power to either or both of said camera means for operation thereof.

12. An electromagnet attachment mechanism as set forth in claim 7 wherein said attachment mechanism is provided with alignment pins which are spring-loaded to project outwardly of said base plate and adapted for interconnection with sockets provided in the grapple fixture on the target object when the attachment mechanism is aligned for docking engagement with the target object preparatory to effecting a grip of the target object.

13. An electromagnet attachment mechanism as set forth in claim 12 further including alignment sensor means for sensing the depression of one or more of said alignment pins on contact with said target object and generating an electrical output signal in response to said contact; and display means responsive to the electrical output signal from said alignment sensor means for indicating said contact.

14. An electromagnet attachment mechanism as set forth in claim 7 wherein said base plate is provided with a central opening and said attachment mechanism further comprising;

centerline camera means having an optical axis mounted in said attachment mechanism housing with the optical axis of said centerline camera means fixed for viewing through said central opening;

monitor means for displaying images from the centerline camera means and having a point optically fixed with respect to the optical axis of the centerline camera means such that the monitor means will display a reflected image of the centerline camera means and a visible pattern on a reflective surface of the grapple fixture on said target object when said grapple fixture is so provided whereby an operator may control the remote manipulator system to maneuver the electromagnet attachment mechanism to align on the monitor means the reflected image of the centerline camera means with the pattern on the grapple fixture to thereby align the attachment mechanism with the grapple fixture in preparation for effecting a grip.

15. An electromagnet attachment mechanism as set forth in claim 14 which further includes a right angle camera means having an optical axis and mounted in said housing with the optical axis of said right angle camera means at a right angle to the optical axis of the centerline camera means, said housing being provided with an opening in the side for accommodating viewing by said right angle camera means through said side opening.

16. An electromagnetic attachment mechanism adapted for interfacing with a manipulator arm of a remote manipulator system, said attachment mechanism comprising:

a housing with a base member at one end thereof;

at least one electromagnet mounted in said housing on said base member, each said electromagnet comprising a magnetic core with pole pieces at the ends thereof and a plurality of coils comprising at least one holding coil and a pull-in coil wound about said magnetic core between said pole pieces;

a spring suspension system mounting each said electromagnet in said housing on said base member with at least one pole piece of each said electromagnet exposed to the exterior of said housing and adapted for movement exteriorly of said housing when attracted to a magnetic strike plate in a grapple fixture affixed to a target object in proximity to the attachment mechanism;

means on said housing for maintaining the pole pieces in spaced relation to said strike plate when said base member of the housing is directed into engagement with said grapple fixture to thereby establish a gap between said pole pieces and said strike plate;

means for energizing said coils whereby each said electromagnet exerts an attractive force on said strike plate when in proximity thereto to cause at least one of the pole pieces of each electromagnet to move through said base member to contact and grip said strike plate and thereby impose a preload force of predetermined magnitude between said pole pieces and said strike plate; and means responsive to said preload force for automatically de-energizing the pull-in coil of each said electromagnet when said preload force is established whereby the grip of the target object is maintained solely by the attractive force of the holding coil.

17. An electromagnetic attachment mechanism as set forth in claim 16 wherein the magnetic core of each said electromagnet is of circular cylinder form.

18. An electromagnetic attachment mechanism, comprising:

a housing;

at least one electromagnet mounted in said housing, said electromagnet comprising a magnetic core with pole pieces at the ends thereof and a plurality of coils wound about said magnetic core between said pole pieces; a spring suspension system having a spring bias mounting said electro-magnet in said housing with the pole pieces exposed for movement when attracted to a ferrous strike plate affixed to a target object in proximity to the attachment mechanism; means on said housing for maintaining said pole pieces in spaced relation to said strike plate when said housing is directed into engagement with said target object to thereby establish a gap between said pole pieces and said strike plate;

means for energizing said coils whereby said electromagnet exerts an attractive force on said strike plate when in proximity thereto to overcome the spring bias of said spring suspension system and to cause said pole pieces to move through said gap to contact and grip said strike plate.

19. The attachment mechanism of claim 18 whereby said means for energizing imposes a preload force of predetermined magnitude between said pole pieces and said strike plate, said attachment mechanism further comprising preload sensor means for detecting the preload force and generating an electrical signal indicative thereof.

20. An electromagnetic attachment mechanism as set forth in claim 18 wherein said plurality of coils comprise pull-in coil means, in cooperation with said means for energizing, for generating the attractive force sufficient to cause said magnet pole pieces to overcome the spring bias and move through said gap to contact and grip the strike plate, and for effecting a grip of predetermined force between said magnet pole pieces and said strike plate; and holding coil means for generating an attractive force sufficient to maintain said grip of predetermined force between said magnet pole pieces and said strike plate when said pull-in coil means is de-energized.

21. The attachment mechanism of claim 20 further comprising preload sensor means for detecting movement of said magnet pole pieces through said gap and establishment of said grip of predetermined force between said magnet pole pieces and said strike plate and for generating an electrical signal indicative of said predetermined force; and means responsive to said electrical signal for automatically de-energizing said pull-in coil means.

22. The method of attaching a grapple fixture to a target object comprising the steps;

carrying on a space vehicle a manipulator arm having a magnetic attachment mechanism;

magnetically gripping the grapple fixture with the attachment mechanism;

carrying on the grapple fixture fastening bolts having slotted heads;

carrying on the attachment mechanism alignment pins having drive tips which cooperatively engage the slotted heads of fastening bolts;

maneuvering the space vehicle and the manipulator arm to place the grapple fixture in the desired proximity to the target object; and driving the alignment pins in a selected direction of rotation to engage the slotted heads of the fastening bolts and, thereby, driving the fastening bolts into accommodating threaded bores provided in the target object.

* * * * *